United States Patent
Tan et al.

(10) Patent No.: US 9,961,393 B2
(45) Date of Patent: May 1, 2018

(54) METHOD AND DEVICE FOR PLAYING MULTIMEDIA FILE

(71) Applicant: Xiaomi Inc., Beijing (CN)

(72) Inventors: Kangxi Tan, Beijing (CN); Xianzhe Wei, Beijing (CN); Ge Ma, Beijing (CN)

(73) Assignee: Xiaomi Inc., Beijing (CN)

( * ) Notice: Subject to any disclaimer, the term of this patent is extended or adjusted under 35 U.S.C. 154(b) by 3 days.

(21) Appl. No.: 15/156,711

(22) Filed: May 17, 2016

(65) Prior Publication Data
US 2016/0373801 A1    Dec. 22, 2016

(30) Foreign Application Priority Data

Jun. 17, 2015   (CN) .......................... 2015 1 0337320

(51) Int. Cl.
H04N 9/80        (2006.01)
H04N 5/932       (2006.01)
H04N 5/935       (2006.01)
H04N 21/43       (2011.01)
G09G 5/12        (2006.01)
(Continued)

(52) U.S. Cl.
CPC ........... *H04N 21/4307* (2013.01); *G09G 5/12* (2013.01); *H04N 21/23605* (2013.01); *H04N 21/4343* (2013.01); *H04N 21/8547* (2013.01); *G09G 2370/04* (2013.01)

(58) Field of Classification Search
USPC .................................. 386/200–234, 239–248
See application file for complete search history.

(56) References Cited

U.S. PATENT DOCUMENTS 7,907,211 B2 *   3/2011   Oostveen ................ G10L 25/48
                                                                348/500
8,505,054 B1 *   8/2013   Kirley ................ H04N 21/4307
                                                                725/74
(Continued)

FOREIGN PATENT DOCUMENTS

CN          1725864 A       1/2006
CN          101047777 A     10/2007
(Continued)

OTHER PUBLICATIONS

Extended European Search Report dated Nov. 9, 2016 for European Application No. 16169688.5, 10 pages.
(Continued)

*Primary Examiner* — Hung Dang
(74) *Attorney, Agent, or Firm* — Brinks, Gilson & Lione

(57) ABSTRACT

A method and a device are provided for playing a multimedia file. The device sends a first audio data packet to an audio player device and sends a first video data packet to a video player device. The first audio data packet and the first video data packet both include a data test identifier. The device receives a first timestamp from the audio player device. The device receives a second timestamp from the video player device. The device then sends a second audio data packet and a second video data packet respectively to the audio player device and the video player device according to the first timestamp and the second timestamp. Thus, the audio player device and the video player device play synchronously the second audio data packet and the second video data packet.

17 Claims, 4 Drawing Sheets

(51) Int. Cl.
*H04N 21/236* (2011.01)
*H04N 21/434* (2011.01)
*H04N 21/8547* (2011.01)

(56) References Cited

U.S. PATENT DOCUMENTS

| | | | |
|---|---|---|---|
| 8,514,705 B2* | 8/2013 | Niamut | H04L 65/4076 370/231 |
| 2001/0008535 A1 | 7/2001 | Lanigan | |
| 2003/0128294 A1 | 7/2003 | Lundblad et al. | |
| 2008/0013512 A1* | 1/2008 | Yurugi | H04N 21/233 370/338 |
| 2010/0135290 A1* | 6/2010 | Curcio | H04L 65/608 370/389 |
| 2010/0303100 A1 | 12/2010 | Niamut et al. | |
| 2011/0276648 A1* | 11/2011 | Soldan | G06F 1/12 709/208 |
| 2012/0324520 A1* | 12/2012 | Van Deventer | H04L 65/605 725/109 |
| 2013/0173950 A1* | 7/2013 | Banerjea | H04J 3/0664 713/503 |
| 2013/0326082 A1* | 12/2013 | Stokking | H04L 29/06517 709/231 |

FOREIGN PATENT DOCUMENTS

| | | |
|---|---|---|
| CN | 101212588 A | 7/2008 |
| CN | 103905880 A | 7/2014 |
| CN | 104980820 A | 10/2015 |
| JP | 2004/193868 A | 7/2004 |
| JP | 2004-282667 A | 10/2004 |
| JP | 2014-127213 A | 7/2014 |
| WO | WO 2006/064689 A1 | 6/2006 |
| WO | WO 2006/118106 A1 | 11/2006 |
| WO | WO 2009/104869 A1 | 8/2009 |
| WO | WO 2009/115121 A2 | 9/2009 |

OTHER PUBLICATIONS

International Search Report and Written Opinion dated Mar. 22, 2016 for International Application No. PCT/CN2015/095330, 18 pages.

Office Action dated Sep. 5, 2017 for Japanese Application No. 2016-525066, 6 pages.

\* cited by examiner

METHOD AND DEVICE FOR PLAYING MULTIMEDIA FILE

This application is based on and claims priority to Chinese Patent Application Serial No. CN 201510337320.0, filed with the State Intellectual Property Office of P. R. China on Jun. 17, 2015, the entire content of which is incorporated herein by reference.

FIELD

The present disclosure relates to computer technology field, and more particularly to a method and a device for playing a multimedia file.

BACKGROUND

As an increasing development of technology, there are more and more multimedia player devices having a playing function, such as a computer, a cell phone, and a tablet PC, via which may play a multimedia file including audio data packets and video data packets. When the multimedia player device plays the multimedia file, the multimedia player device needs to send the audio data packets contained in the multimedia file to an audio player device and send the video data packets contained in the multimedia file to a video player device, so as to play the multimedia file. For example, the multimedia player device is a computer, and when the computer plays the multimedia file, a host of the computer, i.e., a Central Processing Unit (CPU), needs to send the audio data packets contained in the multimedia file to a sound box connected to the CPU, and to send the video data packets contained in the multimedia file to a display connected to the CPU, so as to play the multimedia file.

SUMMARY

In order to solve problems in the related art, the present disclosure provides a method and a device for playing a multimedia file.

According to a first aspect of the present disclosure, a method for playing a multimedia file is provided. The method includes: sending a first audio data packet contained in the multimedia file to an audio player device, in which the first audio data packet includes a data test identifier; sending a first video data packet contained in the multimedia file to a video player device, in which the first video data packet includes the data test identifier; receiving the first timestamp and the second timestamp; and sending a second audio data packet to the audio player device and sending a second video data packet to the video player device respectively according to the first timestamp and the second timestamp, so as to play synchronously the second audio data packet and the second video data packet.

According to a second aspect of the present disclosure, a device for playing a multimedia file is provided. The device sends a first audio data packet to an audio player device and sends a first video data packet to a video player device. The first audio data packet and the first video data packet both include a data test identifier. The device receives a first timestamp from the audio player device. The device receives a second timestamp from the video player device. The device then sends a second audio data packet and a second video data packet respectively to the audio player device and the video player device according to the first timestamp and the second timestamp. Thus, the audio player device and the video player device play synchronously the second audio data packet and the second video data packet.

According to a third aspect of the present disclosure, a device for playing a multimedia file is provided, and the device includes: a processor; and a memory configured to store instructions executable by the processor. The processor is configured to: send a first audio data packet contained in the multimedia file to an audio player device, in which the first audio data packet includes a data test identifier; send a first video data packet contained in the multimedia file to a video player device, in which the first video data packet includes the data test identifier; receive the first timestamp and the second timestamp; and send a second audio data packet to the audio player device and send a second video data packet to the video player device respectively according to the first timestamp and the second timestamp, so as the audio player device and the video player device play synchronously the second audio data packet and the second video data packet.

It should be understood that, the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Figure 1:
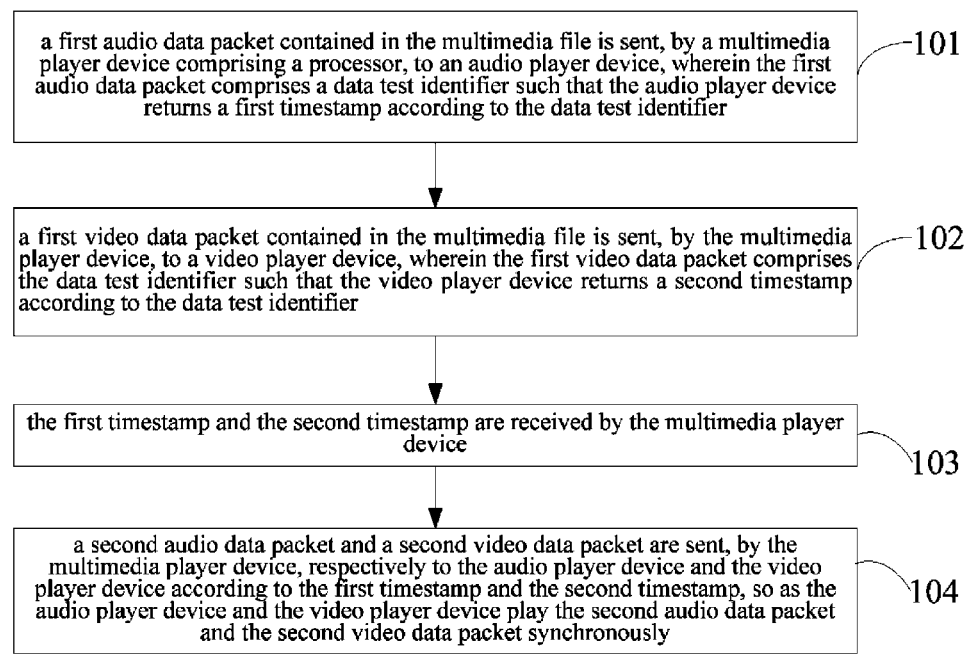
FIG. 1 is a flow chart of a method for playing a multimedia file according to an example embodiment.

FIG. 1 is a flow chart of a method for playing a multimedia file according to an example embodiment. The method may be implemented in a multimedia player device such as a mobile device, a laptop, a tablet, a TV box, etc. As shown in FIG. 1, the method includes steps as follows.

In step 101, a first audio data packet contained in the multimedia file is sent to an audio player device, in which the first audio data packet carries a data test identifier, such that the audio player device returns a first timestamp according to the data test identifier. Here, the first timestamp identifies a first receiving time when the audio player device receives the first audio data packet.

In step 102, a first video data packet contained in the multimedia file is sent to a video player device, in which the first video data packet carries the data test identifier, such that the video player device returns a second timestamp according to the data test identifier. Here, in which the second timestamp identifies a second receiving time when the video player device receives the first video data packet.

In step 103, the first timestamp and the second timestamp are received by the multimedia player device.

In step 104, a second audio data packet is sent to the audio player device and a second video data packet is sent to the video player device respectively according to the first timestamp and the second timestamp when the first timestamp and the second timestamp are received, such that the second audio data packet and the second video data packet are played synchronously, in which, the second audio data packet is an audio data packet sent after the first audio data packet, and the second video data packet is a video data packet sent after the first video data packet.

In embodiments of the present disclosure, the multimedia player device sends the first audio data packet to the audio player device and sends the first video data packet to the video player device, in which each of the first audio data packet and the first video data packet carries the data test identifier, such that the audio player device returns the first timestamp when the audio player device receives the data test identifier and the video player device returns the second timestamp when the video player device receives the data test identifier, and then the multimedia player device sends the second audio data packet to the audio player device and sends the second video data packet to the video player device respectively according to the first timestamp and the second timestamp, thus playing synchronously the second audio data packet and the second video data packet. In this way, a problem of asynchronous audio data and video data when playing the multimedia file may be solved.

In another embodiment of the present disclosure, before sending the first audio data packet contained in the multimedia file to the audio player device, the method further includes:

obtaining an audio data packet periodically from audio data packets contained in the multimedia file, and obtaining a video data packet periodically from video data packets contained in the multimedia file; and adding the data test identifier into obtained audio data packet so as to obtain the first audio data packet, and adding the data test identifier into obtained video data packet so as to obtain the first video data packet.

In another embodiment of the present disclosure, before adding the data test identifier into obtained audio data packet so as to obtain the first audio data packet and adding the data test identifier into obtained video data packet so as to obtain the first video data packet, the method further includes:

encapsulating the data test identifier according to a specified format.

In another embodiment of the present disclosure, sending the second audio data packet to the audio player device and sending the second video data packet to the video player device respectively according to the first timestamp and the second timestamp includes:

determining a transmission time interval of the first audio data packet according to the first timestamp and a sending time of the first audio data packet, so as to obtain an audio transmission time interval;

determining a transmission time interval of the first video data packet according to the second timestamp and a sending time of the first video data packet, so as to obtain a video transmission time interval; and sending the second audio data packet to the audio player device and sending the second video data packet to the video player device respectively according to the audio transmission time interval and the video transmission time interval.

Alternative embodiments of the present disclosure are available by combining the above alternative technical solutions in any form, which will not be elaborated herein.

Figure 2:
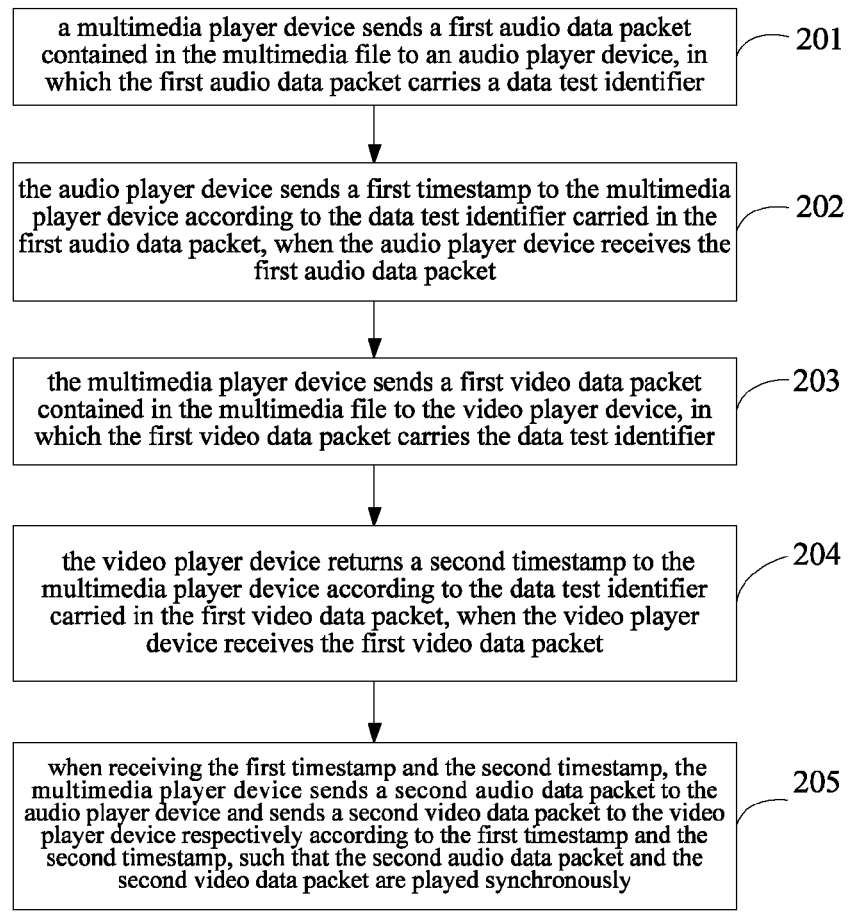
FIG. 2 is a flow chart of another method for playing a multimedia file according to an example embodiment.

FIG. 2 is a flow chart of another method for playing a multimedia file according to an example embodiment, and as shown in FIG. 2, the method includes steps as follows.

In step 201, a multimedia player device sends a first audio data packet contained in the multimedia file to an audio player device, in which the first audio data packet carries a data test identifier.

When the multimedia player device receives a multimedia file playing instruction, the multimedia player device sends audio data packets contained in the multimedia file to the audio player device, and sends video data packets contained in the multimedia file to the video player device, so as to play the multimedia file. In order to ensure that the audio data played by the audio player device keeps in step with the video data played by the video player device, in the process of playing the multimedia file by the multimedia player device, the multimedia player device may obtain one audio data packet (the audio data packet to be played currently) from the multiple audio data packets contained in the multimedia file, and add the data test identifier into obtained audio data packet so as to obtain the first audio data packet, and then, the multimedia player device may send the first audio data packet to the audio player device.

The multimedia file playing instruction is used to play the multimedia file, and is triggered by a user via instruction operations, for example, pressing a play key, clicking a play button with a mouse, and clicking a touch screen, which shall not limited in the present disclosure.

It should be noted that, the data test identifier carried in the first audio data packet is used to obtain a receive time of the first audio data packet from the audio player device, and with the data test identifier, a transmission time of the first audio data packet may be reduced, such that an efficiency of playing synchronously the audio data packet and the video data packet is improved.

Further, in order to ensure that the data test identifier is sent to the audio player device safely, the multimedia player device may encapsulate the data test identifier according to a specified format, before adding the data test identifier into obtained audio data packet.

For example, the data test identifier may be ID1, which for example comprises a string of number(s) such as 10800, or letter(s)/character(s) such as plmokn, or a combination of number(s) and letter(s)/character(s) such as *1001*. For example, the specified format may be #the data test identifier#, such that encapsulated result is #ID1# after encapsulating the data test identifier ID1 by the multimedia player device according to the specified format.

It should be noted that, the audio player device may be a sound box, an amplifier, a multimedia console, a loudspeaker, or the like, which shall not limited in the present disclosure.

In step 202, when the audio player device receives the first audio data packet, the audio player device sends a first timestamp to the multimedia player device according to the data test identifier carried in the first audio data packet. Here, the first timestamp is a timestamp that identifies a first receiving time when the audio player device receives the first audio data packet.

When the audio player device receives the first audio data packet, the audio player device determines that the first audio data packet carries the data test identifier, in this case, the audio player device may obtain a current time of the audio player device, and determine the obtained current time as a receive time of the first audio data packet. In order to ensure a transmission safety of the receive time, the audio player device converts the receive time of the first audio data packet to the first timestamp and sends the first timestamp to the multimedia player device.

Further, since the multimedia player device has encapsulated the data test identifier carried in the first audio data packet according to the specified format when sending the first audio data packet, the audio player device needs to analyze the data test identifier carried in the first audio data packet according to the specified format when receiving the first audio data packet, so as to obtain the data test identifier carried in the first audio data packet.

For example, when the audio player device receives #ID1# as the data test identifier carried in the first audio data packet, the audio player device analyzes #ID1# according to the specified format used by the multimedia player device in encapsulation, so as to obtain ID1 as the data test identifier.

In step 203, the multimedia player device sends a first video data packet contained in the multimedia file to the video player device, in which the first video data packet carries the data test identifier.

In order to ensure that the audio data played by the audio player device keep in step with the video data played by the video player device, in the process of playing the multimedia file by the multimedia player device, the multimedia player device may obtain one video data packet (the video data packet to be played currently) from the multiple video data packets contained in the multimedia file, and add the data test identifier into obtained video data packet so as to obtain the first video data packet, and then, the multimedia player device may send the first video data packet to the video player device.

It should be noted that, the data test identifier carried in the first video player data packet is used to obtain a receive time of the first video data packet from the video player device, and with the data test identifier, a transmission time of the first video player data packet may be reduced, such that an efficiency of playing synchronously the audio data packet and the video data packet is improved.

Further, in order to ensure that the data test identifier is sent to the video player device safely, the multimedia player device may encapsulate the test data identifier according to a specified format, before adding the data test identifier to obtained video data packet.

Specific operations of encapsulating the data test identifier by the multimedia player device are similar to that in step 201, which will not be elaborated herein.

It should be noted that, the video player device not only may be a display of the multimedia player device, e.g. a display of a cell phone, and a display of a tablet PC, but also may be an independent display device, e.g. a display of a desktop computer, and a display of a television, which shall not be limited in the present disclosure.

In step 204, when the video player device receives the first video data packet, the video player device returns a second timestamp to the multimedia player device according to the data test identifier carried in the first video data packet. Here, the second timestamp is a timestamp that identifies a second receiving time when the video player device receives the first video data packet.

When the video player device receives the first video data packet, the video player device determines that the first video data packet carries the data test identifier, in this case, the video player device may obtain a current time of the video player device, and determine the obtained current time as a receive time of the first video data packet. In order to ensure a transmission safety of the receive time, the video player device converts the receive time of the first video data packet to the second timestamp and sends the second timestamp to the multimedia player device.

Further, since the multimedia player device has encapsulated the data test identifier carried in the first video data packet according to the specified format when sending the first video data packet, the video player device needs to analyze the data test identifier carried in the first video data packet according to the specified format when receiving the first video data packet, so as to obtain the data test identifier carried in the first video data packet.

Specific operations of analyzing by the video player device the data test identifier carried in the first video data packet are similar to those in step 202, which will not be elaborated herein.

Further, since there is a performance difference between the audio player device and the video player device, and the transmission time of the audio data packet is unequal to the transmission time of the video data packet, a phenomenon of playing audio data and video data asynchronously may occur, when the multimedia player device plays the multimedia file. In order to avoid such a phenomenon and to avoid increasing a burden on the multimedia player device, the multimedia player device may obtain one audio data packet periodically from audio data packets contained in the multimedia file, and add the data test identifier into the obtained audio data packet so as to obtain the first audio data packet, and then send the first audio data packet periodically to the audio player device, such that the audio player device returns the first timestamp periodically; similarly, the multimedia player device may obtain one video data packet periodically from video data packets contained in the multimedia file, and add the data test identifier to the obtained video data packet so as to obtain the first video data packet, and then send the first video data packet periodically to the video player device, such that the video player device returns the second timestamp periodically, thus solving the phenomenon of playing audio data and video data asynchronously during playing the multimedia file.

It should be noted that, each of the audio player device and the video player device may be connected to the multimedia player device via a data line, which may be a data line supported by a simplex-duplex communication, or a data line supported by a full-duplex communication, e.g. HDMI (High Definition Multimedia Interface), and USB (Universal Series BUS), which shall not be limited in the present disclosure.

In step 205, the multimedia player device sends a second audio data packet to the audio player device and sends a second video data packet to the video player device respectively according to the first timestamp and the second timestamp when receiving the first timestamp and the second timestamp, such that the second audio data packet and the second video data packet are played synchronously, in which the second audio data packet is an audio data packet sent after the first audio data packet, and the second video data packet is a video data packet sent after the first video data packet.

When the multimedia player device receives the first timestamp and the second timestamp, the multimedia player device determines a transmission time interval according to the first timestamp and a sending time of the first audio data packet, so as to obtain an audio transmission time interval; similarly, the multimedia player device determines a transmission time interval of the first video data packet according to the second timestamp and a sending time of the first video data packet, so as to obtain a video transmission time interval. The multimedia player device sends the second audio data packet to the audio player device and sends the second video data packet to the video player device respectively according to the audio transmission time interval and the video transmission time interval.

The multimedia player device may determine the transmission time interval of the first audio data packet according to the first timestamp and the sending time of the first audio data packet as follows, so as to obtain the audio transmission time interval. The multimedia player device converts the first timestamp so as to obtain a receive time of the first audio data packet, computes a difference between a receive time of the first audio data packet and a sending time of the first audio data packet, and determines the difference as the transmission time interval of the first audio data packet. Similarly, the multimedia player device may determine the transmission time interval of the first video data packet according to the second timestamp and the sending time of the first video data packet as follows, so as to obtain the video transmission time interval. The multimedia player device converts the second timestamp so as to obtain a receive time of the first video data packet, computes a difference between a receive time of the first video data packet and a sending time of the first video data packet, and determines the difference as the transmission time interval of the first video data packet.

In addition, operations performed by the multimedia player device for sending the second audio data packet to the audio player device and sending the second video data packet to the video player device respectively according to the first timestamp and the second timestamp when receiving the first timestamp and the second timestamp so as to play synchronously the second audio data packet and the second video data packet may include situations (1)-(3) as follows.

(1) If the audio transmission time interval is greater than the video transmission time interval, it is determined that the transmission time of the first audio data packet is longer than the transmission time of the first video data packet, and a delay time is obtained by computing a difference between the video transmission time interval and the audio transmission time interval. Thus, the multimedia player device may first send the second audio data packet to the audio player device, and meanwhile, the multimedia player device may start timing from the sending time of the second audio data packet, and the multimedia player device may send the second video data packet to the video player device if the timekeeping time reaches the delay time, thus playing synchronously the second audio data packet and the second video data packet.

For example, the audio transmission time interval of the first audio data packet is 1 s and the video transmission time interval of the first video data packet is 0.5 s, it is determined that the transmission time of the first audio data packet is 0.5 s longer than the transmission time of the first video data packet, and the delay time is determined as 0.5 s by computing the difference between the video transmission time interval and the audio transmission time interval. Therefore, the multimedia player device may first send the second audio data packet to the audio player device, and meanwhile, the multimedia player device may start timing since the sending time of the second audio data packet, and then the multimedia player device may send the second video data packet to the video player device if the timekeeping time reaches the delay time 0.5 s, thus playing the second audio data packet and the second video data packet synchronously.

(2) If the audio transmission time interval is less than the video transmission time interval, it is determined that the transmission time of the first audio data packet is shorter than the transmission time of the first video data packet, and a delay time is obtained by computing a difference between the audio transmission time interval and the video transmission time interval. Therefore, the multimedia player device may first send the second video data packet to the video player device, and meanwhile, the multimedia player device may start timing from the sending time of the second video data packet, and then the multimedia player device may send the second audio data packet to the audio player device if the timekeeping time reaches the delay time, thus playing the second audio data packet and the second video data packet synchronously.

For example, the audio transmission time interval of the first audio data packet is 0.5 s and the video transmission time interval of the first video data packet is 1 s, it is determined that the transmission time of the first audio data packet is shorter than the transmission time of the first video data packet, and the delay time is determined as 0.5 s by computing the difference between the video transmission time interval and the audio transmission time interval.

Therefore, the multimedia player device may first send the second video data packet to the video player device, and meanwhile, the multimedia player device may start timing since the sending time of the second video data packet, and then the multimedia player device may send the second audio data packet to the audio player device if the time-keeping time reaches the delay time 0.5 s, thus play synchronously the second audio data packet and the second video data packet.

(3) If the audio transmission time interval is equal to the video transmission time interval, it is determined that the transmission time of the first audio data packet is equal to the transmission time of the first video data packet. Therefore, the multimedia player device may send the second audio data packet to the audio player device, while sending the second video data packet to the video player device, so as to play synchronously the second audio data packet and the second video data packet.

For example, the audio transmission time interval of the first audio data packet is 0.5 s and the video transmission time interval of the first video data packet is also 0.5 s, the multimedia player device determines that the transmission time of the first audio data packet is equal to the transmission time of the first video data packet, and thus, the multimedia player device may send the second audio data packet to the audio player device and send the second video data packet to the video player device at the same time, so as to play synchronously the second audio data packet and the second video data packet.

In embodiments of the present disclosure, the multimedia player device sends the first audio data packet to the audio player device and sends the first video data packet to the video player device, in which each of the first audio data packet and the first video data packet carries the data test identifier, such that the audio player device returns the first timestamp when the audio player device receives the data test identifier and the video player device returns the second timestamp when the video player device receives the data test identifier, and then the multimedia player device sends the second audio data packet to the audio player device and sends the second video data packet to the video player device respectively according to the first timestamp and the second timestamp, thus playing the second audio data packet and the second video data packet synchronously. In this way, a problem of asynchronous audio data and video data during playing the multimedia file may be solved. Since the data test identifier is carried periodically, the multimedia player device may adjusts periodically the problem of asynchronous audio data and video data during playing the multimedia file, and meanwhile, other operations of the multimedia player device will not be affected, thus avoiding a burden generated by real-time adjustment during playing the multimedia file by the multimedia player device.

Figure 3:
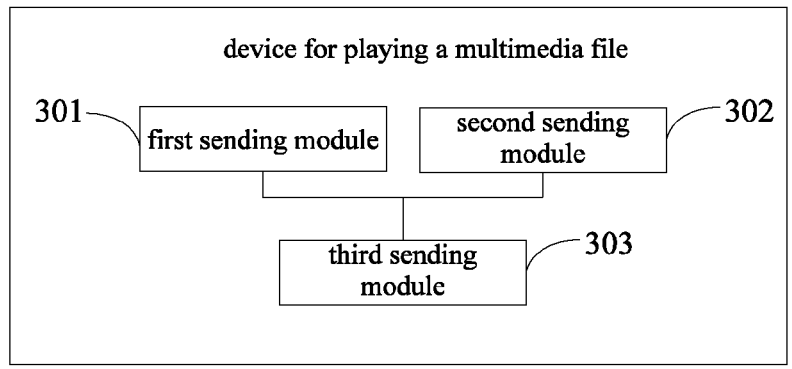
FIG. 3 is a block diagram of a device for playing a multimedia file according to an example embodiment.

FIG. 3 is a block diagram of a device for playing a multimedia file according to an example embodiment. As shown in FIG. 3, the device includes a first sending module 301, a second sending module 302, and a third sending module 303.

The first sending module 301 is configured to send a first audio data packet contained in the multimedia file to an audio player device, in which the first audio data packet carries a data test identifier, such that the audio player device returns a first timestamp according to the data test identifier. Here, the first timestamp is a timestamp that identifies a first receiving time when the audio player device receives the first audio data packet.

The second sending module 302 is configured to send a first video data packet contained in the multimedia file to a video player device, in which the first video data packet carries the data test identifier, such that the video player device returns a second timestamp according to the data test identifier. Here, the second timestamp is a timestamp that identifies a second receiving time when the video player device receives the first video data packet.

The third sending module 303 is configured to send a second audio data packet to the audio player device and send a second video data packet to the video player device respectively according to the first timestamp and the second timestamp when the first timestamp and the second timestamp are received, such that the second audio data packet and the second video data packet are played synchronously, in which, the second audio data packet is an audio data packet sent after the first audio data packet, and the second video data packet is a video data packet sent after the first video data packet.

Figure 4:
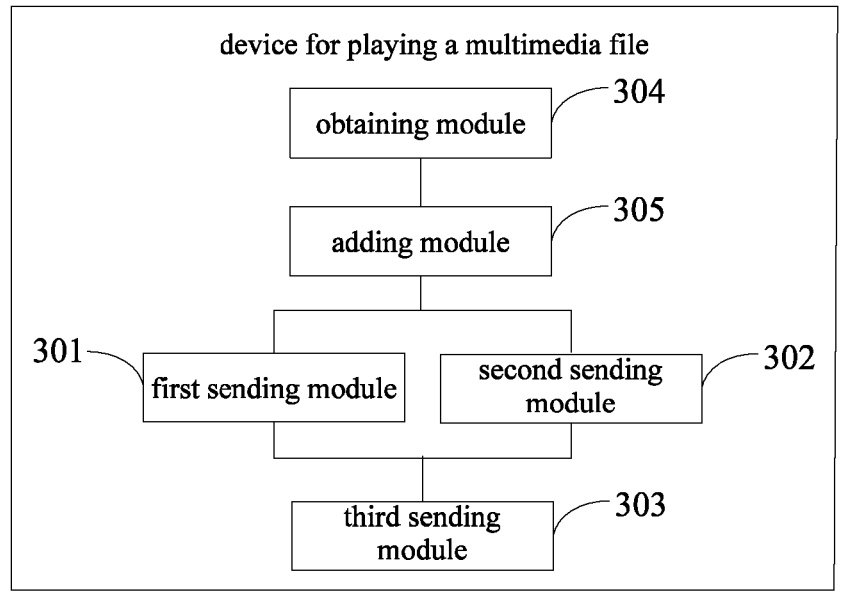
FIG. 4 is a block diagram of another device for playing a multimedia file according to an example embodiment.

In another embodiment of the present disclosure, as shown in FIG. 4, the device further includes an obtaining module 304 and an adding module 305.

The obtaining module 304 is configured to obtain an audio data packet periodically from audio data packets contained in the multimedia file, and obtain a video data packet periodically from video data packets contained in the multimedia file.

The adding module 305 is configured to add the data test identifier into obtained audio data packet so as to obtain the first audio data packet and add the data test identifier into obtained video data packet so as to obtain the first video data packet.

Figure 5:
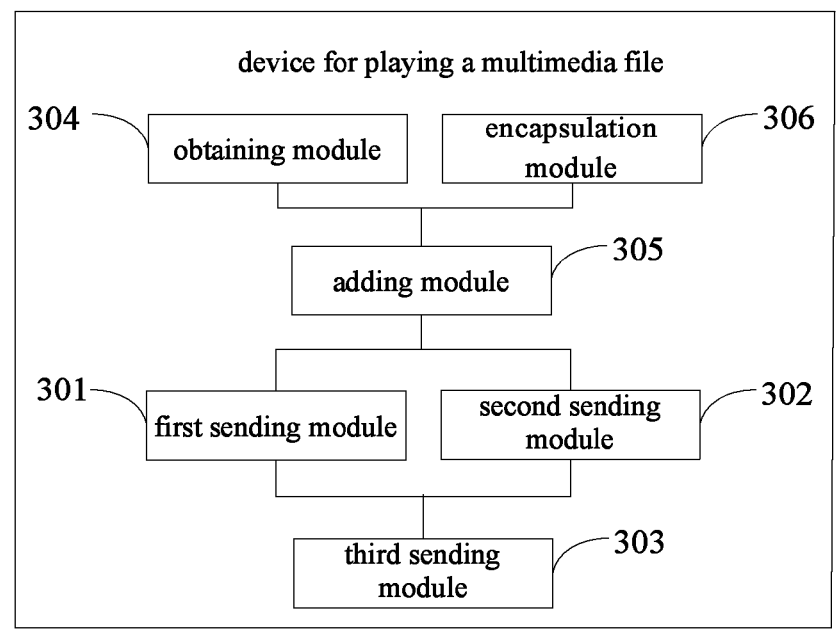
FIG. 5 is a block diagram of yet another device for playing a multimedia file according to an example embodiment.

In another embodiment of the present disclosure, as shown in FIG. 5, the device further includes an encapsulation module 306.

The encapsulation module 306 is configured to encapsulate the data test identifier according to a specified format.

Figure 6:
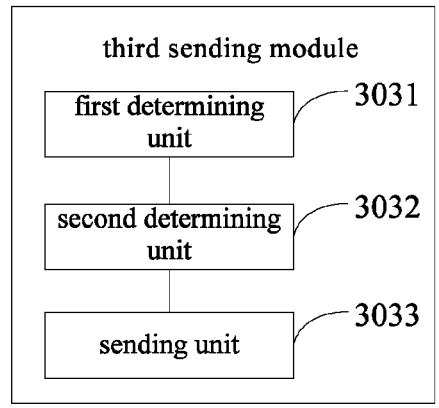
FIG. 6 is a block diagram of a third sending module according to an example embodiment.

In another embodiment of the present disclosure, as shown in FIG. 6, the third sending module 303 includes a first determining unit 3031, a second determining unit 3032, and a sending unit 3033.

The first determining unit 3031 is configured to determine a transmission time interval of the first audio data packet according to the first timestamp and a sending time of the first audio data packet, so as to obtain an audio transmission time interval.

The second determining unit 3032 is configured to determine a transmission time interval of the first video data packet according to the second timestamp and a sending time of the first video data packet, so as to obtain a video transmission time interval.

The sending unit 3033 is configured to send the second audio data packet to the audio player device and send the second video data packet to the video player device respectively according to the audio transmission time interval and the video transmission time interval.

In embodiments of the present disclosure, the multimedia player device sends the first audio data packet to the audio player device and sends the first video data packet to the video player device, in which each of the first audio data packet and the first video data packet carries the data test identifier, such that the audio player device returns the first timestamp when the audio player device receives the data test identifier and the video player device returns the second timestamp when the video player device receives the data test identifier, and then the multimedia player device sends the second audio data packet to the audio player device and sends the second video data packet to the video player device respectively according to the first timestamp and the second timestamp, thus playing synchronously the second audio data packet and the second video data packet. In this way, a problem of asynchronous audio data and video data during playing the multimedia file may be solved. Since the data test identifier is carried periodically, the multimedia player device may adjust periodically the problem of asynchronous audio data and video data during playing the multimedia file, and meanwhile, other operations of the multimedia player device will not be affected, thus avoiding a burden generated by real-time adjustment during playing the multimedia file by the multimedia player device.

With respect to the devices in the above embodiments, the specific operation modes of individual modules therein have been described in detail in the embodiments regarding the method, which will not be elaborated herein.

Figure 7:
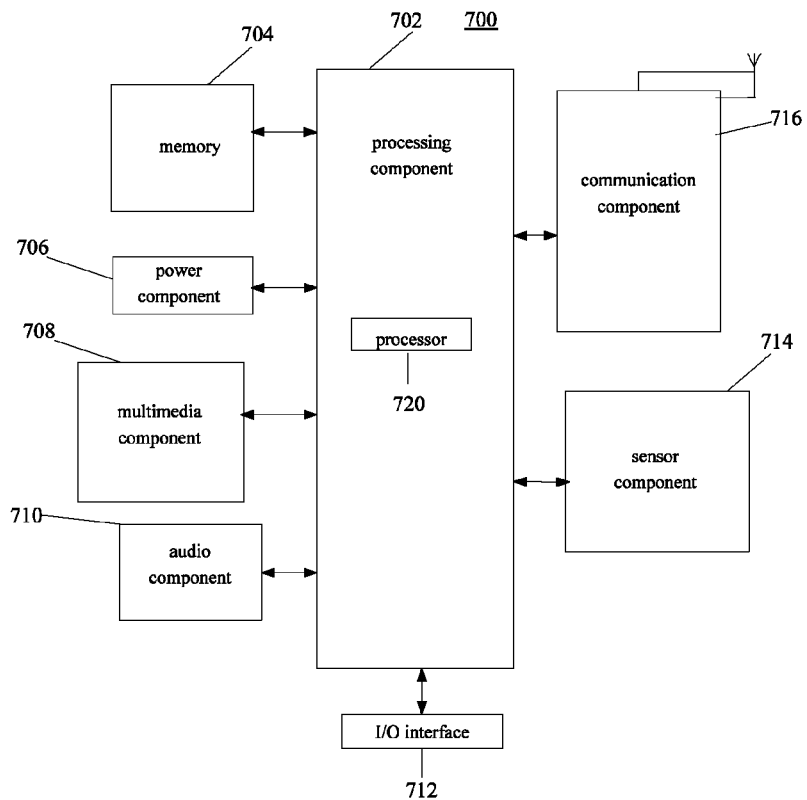
FIG. 7 is a block diagram of another device for playing a multimedia file according to an example embodiment.

FIG. 7 is a block diagram of a device 700 for playing a multimedia file according to an example embodiment. For example, the device 700 may be a mobile phone, a computer, a digital broadcasting terminal, a messaging device, a game console, a tablet device, a fitness equipment, a Personal Digital Assistant PDA, etc.

Referring to FIG. 7, the device 700 may include the following one or more components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 708 includes a front camera and/or a rear camera. The front camera and the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the intelligent device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface for the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700 and relative positioning of components (e.g. the display and the keypad of the device 700). The sensor component 714 may also detect a change in position of the device 700 or of a component in the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network according to a communication standard, such as WIFI, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented according to a radio frequency identification (RFID) technology, an infrared data association (IrDA) technology, an ultra-wideband (UWB) technology, a Bluetooth (BT) technology, and other technologies.

In exemplary embodiments, the device 700 may be implemented with processing circuitry including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module discussed above, such as the first sending module 301, the second sending module 302, and the third sending module 303, may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example In exemplary embodiments, there is also provided a non-transitory computer readable storage medium including instructions, such as the memory 704 including instructions. The above instructions are executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium having stored therein instructions that, when executed by a processor of a mobile terminal, cause the mobile terminal to perform acts including:

sending a first audio data packet contained in the multimedia file to an audio player device, wherein the first audio data packet carries a data test identifier, such that the audio player device returns a first timestamp according to the data test identifier;

sending a first video data packet contained in the multimedia file to a video player device, in which the first video data packet carries the data test identifier, such that the video player device returns a second timestamp according to the data test identifier; and sending a second audio data packet to the audio player device and sending a second video data packet to the video player device respectively according to the first timestamp and the second timestamp when receiving the first timestamp and the second timestamp, so as to play synchronously the second audio data packet and the second video data packet, in which, the second audio data packet is an audio data packet sent after the first audio data packet, and the second video data packet is a video data packet sent after the first video data packet. Here, the first timestamp is a timestamp that identifies a first receiving time when the audio player device receives the first audio data packet. The second timestamp is a timestamp identifies a second receiving time when the video player device receives the first video data packet In another embodiment of the present disclosure, before sending the first audio data packet contained in the multimedia file to the audio player device, the method further includes:

obtaining an audio data packet periodically from audio data packets contained in the multimedia file, and obtaining a video data packet periodically from video data packets contained in the multimedia file; and adding the data test identifier into obtained audio data packet so as to obtain the first audio data packet, and adding the data test identifier into obtained video data packet so as to obtain the first video data packet.

In another embodiment of the present disclosure, before adding the data test identifier into obtained audio data packet so as to obtain the first audio data packet and adding the data test identifier into obtained video data packet so as to obtain the first video data packet, the method further includes:

encapsulating the data test identifier according to a specified format.

In another embodiment of the present disclosure, sending the second audio data packet to the audio player device and sending the second video data packet to the video player device respectively according to the first timestamp and the second timestamp includes:

determining a transmission time interval of the first audio data packet according to the first timestamp and a sending time of the first audio data packet, so as to obtain an audio transmission time interval;

determining a transmission time interval of the first video data packet according to the second timestamp and a sending time of the first video data packet, so as to obtain a video transmission time interval; and sending the second audio data packet to the audio player device and sending the second video data packet to the video player device respectively according to the audio transmission time interval and the video transmission time interval.

In embodiments of the present disclosure, the multimedia player device sends the first audio data packet to the audio player device and sends the first video data packet to the video player device, in which each of the first audio data packet and the first video data packet carries the data test identifier, such that the audio player device returns the first timestamp when the audio player device receives the data test identifier and the video player device returns the second timestamp when the video player device receives the data test identifier, and then the multimedia player device sends the second audio data packet to the audio player device and sends the second video data packet to the video player device respectively according to the first timestamp and the second timestamp, thus playing the second audio data packet and the second video data packet synchronously. In this way, a problem of asynchronous audio data and video data during playing the multimedia file may be solved.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for playing a multimedia file, comprising:
  sending, by a multimedia player device comprising a processor, a first audio data packet contained in the multimedia file to an audio player device, wherein the first audio data packet comprises a data test identifier such that the audio player device returns a first timestamp according to the data test identifier;
  sending, by the multimedia player device, a first video data packet contained in the multimedia file to a video player device, wherein the first video data packet comprises the data test identifier such that the video player device returns a second timestamp according to the data test identifier;

receiving, by the multimedia player device, the first timestamp and the second timestamp; and sending, by the multimedia player device, a second audio data packet and a second video data packet respectively to the audio player device and the video player device according to the first timestamp and the second timestamp, so as the audio player device and the video player device play the second audio data packet and the second video data packet synchronously, wherein the method further comprises:

determining a transmission time interval of the first audio data packet according to the first timestamp and a sending time of the first audio data packet, so as to obtain an audio transmission time interval;

determining a transmission time interval of the first video data packet according to the second timestamp and a sending time of the first video data packet, so as to obtain a video transmission time interval;

calculating, by the multimedia player device, a difference between the audio transmission time interval and the video transmission time interval so as to determine whether to delay the second audio data packet or the second video data packet; and when determining to delay the second audio data packet or the second video data packet, determining, by the multimedia player device, a delay of the second audio data packet or the second video data packet based on the difference between the audio transmission time interval and the video transmission time interval and sending the second audio data packet to the audio player device and sending the second video data packet to the video player device respectively according to the delay of the second audio data packet or the second video data packet to ensure the second audio data packet and the second video data packet are played synchronously.

2. The method according to claim 1, wherein the first timestamp identifies a first receiving time when the audio player device receives the first audio data packet.

3. The method according to claim 2, wherein the second timestamp identifies a second receiving time when the video player device receives the first video data packet.

4. The method according to claim 3, wherein the second audio data packet is an audio data packet sent after the first audio data packet, and the second video data packet is a video data packet sent after the first video data packet.

5. The method according to claim 1, wherein, before sending the first audio data packet contained in the multimedia file to the audio player device, the method further comprises:

obtaining an audio data packet periodically from audio data packets contained in the multimedia file, and obtaining a video data packet periodically from video data packets contained in the multimedia file; and adding the data test identifier into obtained audio data packet so as to obtain the first audio data packet, and adding the data test identifier into obtained video data packet so as to obtain the first video data packet.

6. The method according to claim 5, wherein, before adding the data test identifier into obtained audio data packet so as to obtain the first audio data packet and adding the data test identifier into obtained video data packet so as to obtain the first video data packet, the method further comprises:

encapsulating the data test identifier according to a specified format.

7. A device for playing a multimedia file, comprising:
a processor; and
a memory configured to store instructions executable by the processor,
wherein the processor is configured to:
send a first audio data packet contained in the multimedia file to an audio player device, wherein the first audio data packet comprises a data test identifier, such that the audio player device returns a first timestamp according to the data test identifier, the first timestamp being a timestamp at which the audio player device receives the first audio data packet;
send a first video data packet contained in the multimedia file to a video player device, wherein the first video data packet comprises the data test identifier, such that the video player device returns a second timestamp according to the data test identifier, the second timestamp being a timestamp at which the video player device receives the first video data packet;
receive the first timestamp and the second timestamp; and
send a second audio data packet and a second video data packet respectively to the audio player device and the video player device according to the first timestamp and the second timestamp, so as the audio player device and the video player device play synchronously the second audio data packet and the second video data packet, wherein the processor is configured to:
determine a transmission time interval of the first audio data packet according to the first timestamp and a sending time of the first audio data packet, so as to obtain an audio transmission time interval;
determine a transmission time interval of the first video data packet according to the second timestamp and a sending time of the first video data packet, so as to obtain a video transmission time interval;
calculate a difference between the audio transmission time interval and the video transmission time interval so as to determine whether to delay the second audio data packet or the second video data packet; and
when determining to delay the second audio data packet or the second video data packet, determine a delay of the second audio data packet or the second video data packet based on the difference between the audio transmission time interval and the video transmission time interval and send the second audio data packet to the audio player device and send the second video data packet to the video player device respectively according to the delay of the second audio data packet or the second video data packet to ensure the second audio data packet and the second video data packet are played synchronously.

8. The device according to claim 7, wherein the first timestamp identifies a first receiving time when the audio player device receives the first audio data packet.

9. The device according to claim 8, wherein the second timestamp identifies a second receiving time when the video player device receives the first video data packet.

10. The device according to claim 9, wherein the second audio data packet is an audio data packet sent after the first audio data packet, and the second video data packet is a video data packet sent after the first video data packet.

11. The device according to claim 7, wherein the processor is further configured to:

obtain an audio data packet periodically from audio data packets contained in the multimedia file, and obtain a video data packet periodically from video data packets contained in the multimedia file; and add the data test identifier into obtained audio data packet so as to obtain the first audio data packet, and add the data test identifier into obtained video data packet so as to obtain the first video data packet.

12. The device according to claim 11, wherein the processor is further configured to:

encapsulate the data test identifier according to a specified format, before adding the data test identifier into obtained audio data packet so as to obtain the first audio data packet and adding the data test identifier into obtained video data packet so as to obtain the first video data packet.

13. A non-transitory computer readable storage medium having stored therein instructions that, when executed by a processor of a device, causes the device to perform acts comprising:

sending a first audio data packet contained in a multimedia file to an audio player device, wherein the first audio data packet comprises a data test identifier such that the audio player device returns a first timestamp according to the data test identifier, wherein the first timestamp is a timestamp at which the audio player device receives the first audio data packet;

sending a first video data packet contained in the multimedia file to a video player device, wherein the first video data packet comprises the data test identifier such that the video player device returns a second timestamp according to the data test identifier, wherein the second timestamp is a timestamp at which the video player device receives the first video data packet; and sending a second audio data packet to the audio player device and sending a second video data packet to the video player device respectively according to the first timestamp and the second timestamp when receiving the first timestamp and the second timestamp, so as to play the second audio data packet and the second video data packet synchronously, wherein the second audio data packet is an audio data packet sent after the first audio data packet, and the second video data packet is a video data packet sent after the first video data packet, wherein the acts further comprise:

determining a transmission time interval of the first audio data packet according to the first timestamp and a sending time of the first audio data packet, so as to obtain an audio transmission time interval;

determining a transmission time interval of the first video data packet according to the second timestamp and a sending time of the first video data packet, so as to obtain a video transmission time interval;

calculating a difference between the audio transmission time interval and the video transmission time interval so as to determine whether to delay the second audio data packet or the second video data packet; and when determining to delay the second audio data packet or the second video data packet, determining a delay of the second audio data packet or the second video data packet based on the difference between the audio transmission time interval and the video transmission time interval and sending the second audio data packet to the audio player device and sending the second video data packet to the video player device respectively according to the delay of the second audio data packet or the second video data packet to ensure the second audio data packet and the second video data packet are played synchronously.

14. The non-transitory computer readable storage medium according to claim 13, wherein the first timestamp identifies a first receiving time when the audio player device receives the first audio data packet; and wherein the second timestamp identifies a second receiving time when the video player device receives the first video data packet.

15. The non-transitory computer readable storage medium according to claim 14, wherein the second audio data packet is an audio data packet sent after the first audio data packet, and the second video data packet is a video data packet sent after the first video data packet.

16. The non-transitory computer readable storage medium according to claim 13, wherein the acts further comprise:

obtaining an audio data packet periodically from audio data packets contained in the multimedia file, and obtaining a video data packet periodically from video data packets contained in the multimedia file; and adding the data test identifier into obtained audio data packet so as to obtain the first audio data packet, and adding the data test identifier into obtained video data packet so as to obtain the first video data packet.

17. The non-transitory computer readable storage medium according to claim 16, wherein the acts further comprise:

encapsulating the data test identifier according to a specified format.

* * * * *